US 11,125,960 B2

(12) United States Patent
Abbiati

(10) Patent No.: US 11,125,960 B2
(45) Date of Patent: Sep. 21, 2021

(54) PORT SEALING DEVICE FOR AN OPTICAL CABLE TERMINATION BOX

(71) Applicant: Prysmian S.p.A., Milan (IT)

(72) Inventor: Fabio Abbiati, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 16/616,259

(22) PCT Filed: May 23, 2017

(86) PCT No.: PCT/EP2017/062362
§ 371 (c)(1),
(2) Date: Nov. 22, 2019

(87) PCT Pub. No.: WO2018/215051
PCT Pub. Date: Nov. 29, 2018

(65) Prior Publication Data
US 2020/0158973 A1 May 21, 2020

(51) Int. Cl.
*G02B 6/44* (2006.01)
*H02G 15/013* (2006.01)

(52) U.S. Cl.
CPC ......... *G02B 6/4444* (2013.01); *G02B 6/4446* (2013.01); *H02G 15/013* (2013.01)

(58) Field of Classification Search
CPC .. G02B 6/4444; G02B 6/4446; H02G 15/013; H02G 15/04
See application file for complete search history.

(56) References Cited

U.S. PATENT DOCUMENTS

| 5,567,916 A | 10/1996 | Napiorkowski et al. |
| 5,886,300 A | 3/1999 | Strickler |
| 8,648,258 B2 * | 2/2014 | Drouard ............... H02G 15/007 174/152 G |

(Continued)

FOREIGN PATENT DOCUMENTS

| EP | 2216867 A2 | 8/2010 |
| FR | 2723162 A1 | 2/1996 |

(Continued)

*Primary Examiner* — Thomas A Hollweg
*Assistant Examiner* — Mary A El-Shammaa
(74) *Attorney, Agent, or Firm* — Slater Matsil, LLP

(57) ABSTRACT

A port sealing device includes a body configured to switch between an open configuration and a closed configuration. The body defines a cable pass-through channel extending along an axial direction when the body is in the closed configuration. The port sealing device includes sealing arrays arranged in the cable pass-through channel, where each of the sealing arrays is arranged in the cable pass-through channel along an annular direction around the axial direction. Each of the sealing arrays is spaced apart from an adjacent one of the sealing arrays along the axial direction. Each of the sealing arrays includes sealing elements mutually spaced apart along the annular direction, where the sealing elements of one of the sealing arrays is arranged in the cable pass-through channel with a pattern different from the pattern of the sealing elements of an adjacent one of the sealing arrays. The port sealing device is configured to receive an optical cable when passing through a peripheral wall of a termination box.

18 Claims, 4 Drawing Sheets

(56) References Cited

U.S. PATENT DOCUMENTS

2016/0204592 A1    7/2016   Coenegracht et al.
2019/0346646 A1*   11/2019   Trezise ................ G02B 6/4444

FOREIGN PATENT DOCUMENTS

| WO | WO-2010047920 A2 * | 4/2010 | ........... H02G 3/0675 |
| WO | 2015120901 A1 | 8/2015 | |
| WO | WO-2015120901 A1 * | 8/2015 | ........... G02B 6/4444 |

* cited by examiner

PORT SEALING DEVICE FOR AN OPTICAL CABLE TERMINATION BOX

CROSS-REFERENCE TO RELATED APPLICATIONS

This application is a national stage of International Application No. PCT/EP2017/062362, filed on May 23, 2017, which application is hereby incorporated herein by reference.

TECHNICAL FIELD

The present invention relates to the field of equipment and components for the installation of optical cables in optical networks. In particular, the present invention relates to a port sealing device for an optical cable termination box.

BACKGROUND

A FTTH ("Fiber To The Home") network is an optical access network providing a number of end users with broadband communication services, i.e. with services requiring data transmission at a very high rate, for example of some Mbit/s.

Typically, a FTTH network comprises a distribution box or cabinet which cooperates with an access network and which is typically located in the basement of the building where the end users reside. An optical trunk cable, hereinafter referred to as "riser cable", exits the distribution box and runs through the building from the basement up to all the building floors.

At each floor of the building, the riser cable may be optically connected to one or more optical cables, hereinafter referred to as "drop cables". Each drop cable typically terminates at its far end into a respective customer optical termination box located within or in proximity of the apartment or office of an end user.

During installation of the optical termination box, the operator has to lay down the drop cable from a distribution cabinet to the apartment of the end user where the operator has to cut the drop cable and connect the optical fibres to optical connectors by means of optical fibre splices.

The termination boxes are provided with a plurality of ports located in the peripheral wall of the box which are used for causing the fibre cable to enter the box.

When not in use, the ports must be closed by a respective removable device, usually a grommet, in order to guarantee the tightness of the inner space of the termination box and the formation of a passage for the insertion of the cable when this latter has to be installed.

Common grommets have an annular shape and define a channel which is closed by a star-cut membrane. When a cable is passed across the membrane, converging sectors of the membrane flex, and openings are created therebetween. The channel therefore is not properly sealed, since fluids and dust can pass through the openings after the insertion of the cable.

WO 2015120901 discloses a port sealing device for housing an optical cable when passing through a peripheral wall of a termination box. This port sealing device comprises two complementary bodies, which are superimposed one another in order to define a channel for the passage of the cable therebetween. The channel is provided on its internal surface with a plurality of flexible rings designed to tighten the cable and seal the channel when the cable is arranged therein.

The two complementary bodies are initially connected by a cup. When the port sealing device is mounted within an opening of a peripheral wall of the termination box, the cup closes the channel providing a seal until a cable is inserted in the channel. Then, the passage of the cable is allowed by the removal of the cup. In case of removal of the cable, the channel will remain unsealed.

EP 2216867 discloses a port sealing device where a through hole adapted to receive a cable is initially closed by a weakened film. Upon insertion of the cable the weakening film is broken, and flexible rings keep the hole sealed. However, in case of removal of the cable the hole remains unsealed.

U.S. Pat. No. 5,567,916 discloses a grommet with a sealing membrane, which is pre-creased with two different patterns on its opposite surfaces. Insertion of the cable from a surface causes the membrane to be star-cut, while from the other membrane a circular opening will be formed. Different kinds of cables can be passed through the membrane by breaking the membrane in the proper position. However, sealing cannot be guaranteed both in presence and in absence of a cable.

SUMMARY

In various embodiments, a port sealing device is provided for optical cable termination boxes which can guarantee a proper sealing before the installation of the cable, in presence of the cable, and after a possible removal of the cable.

The Applicant has found that by providing a port sealing device with sealing elements mutually spaced apart along a longitudinal direction and arranged with different patterns, a proper sealing is guaranteed in any conditions.

In fact, upon passage of the cable, the sealing elements of each array flex and create openings between adjacent sealing members. Since the sealing elements of different arrays are arranged according to different patterns, fluid will hardly enters inside the termination box, and therefore a fluid passing through an opening in a first array will be stopped by a sealing element of another array.

Therefore, the present invention relates to a port sealing device for receiving an optical cable when passing through a peripheral wall of a termination box, comprising: a body configured to switch between an open and a closed configuration, the body defining a cable pass-through channel extending along an axial direction when the body is in closed configuration, sealing arrays arranged in the channel, each sealing array being arranged in the channel along an annular direction around the axial direction, each sealing array being spaced apart from an adjacent sealing array along the axial direction and comprising sealing elements mutually spaced apart along the annular direction, wherein the sealing elements of a sealing array are arranged in the channel with a pattern different from the pattern of the sealing elements of an adjacent sealing arrays.

According to some embodiments, upon introduction of an optical cable in the channel, openings form between the sealing elements of each sealing array the sealing elements of the sealing arrays being arranged such that the openings forming between the sealing elements of a sealing array are closed, along the axial direction, by the sealing elements of one or more adjacent sealing arrays.

Preferably, each sealing element comprises a tab projecting from the body into the channel, and the tabs of a sealing array have mutually converging end portions.

Preferably, the end portions of the tabs of a sealing array are configured to flex along the axial direction upon introduction of an optical cable in the channel along the axial direction.

In one embodiment, when the port sealing device is in the open configuration, the sealing elements of each sealing array are arranged mutually adjacent along a longitudinal direction and each sealing array is spaced apart from an adjacent sealing array along a transverse direction perpendicular to said longitudinal direction.

Preferably the body is made of flexible material.

In particular, the body has two end portions with respective connecting portions and a joining portion joining the two end portions. In the open configuration the two end portions are spaced apart along the longitudinal direction, and in the closed configuration the two end portions are connected through removable coupling of the two connecting portions.

In particular, one of the two connecting portions comprises a seat, and the other connecting portion comprises a coupling member which is configured to engage into the seat for coupling the two end portions.

Preferably, in the open configuration, the sealing elements of a sealing array are offset along the longitudinal direction with respect to the sealing elements of an adjacent sealing array.

Preferably, the body comprises at least three sealing arrays for passage of the optical cable and the axial direction is perpendicular to the three sealing arrays.

In one embodiment, the body comprises guiding portions configured to cooperate with corresponding guiding portions formed in the termination box.

BRIEF DESCRIPTION OF THE DRAWINGS

The present invention will now be described in more detail hereinafter with reference to the accompanying drawings, in which some embodiments of the invention are shown, wherein.

DETAILED DESCRIPTION OF ILLUSTRATIVE EMBODIMENTS

For the purposes of the present description and claims an optical cable is deemed to be any optical cable comprising one or more optical fibre units, an outer sheath and, optionally, flexible strength members.

A fibre unit is defined as an assembly comprising one (or more) optical fibre(s) which is constituted by a glass core, a glass cladding, a single or dual coating layer and an outer layer surrounding the said one (or more) optical fibre(s) in order to protect the overall optical fibre(s) from damage.

Figure 1:
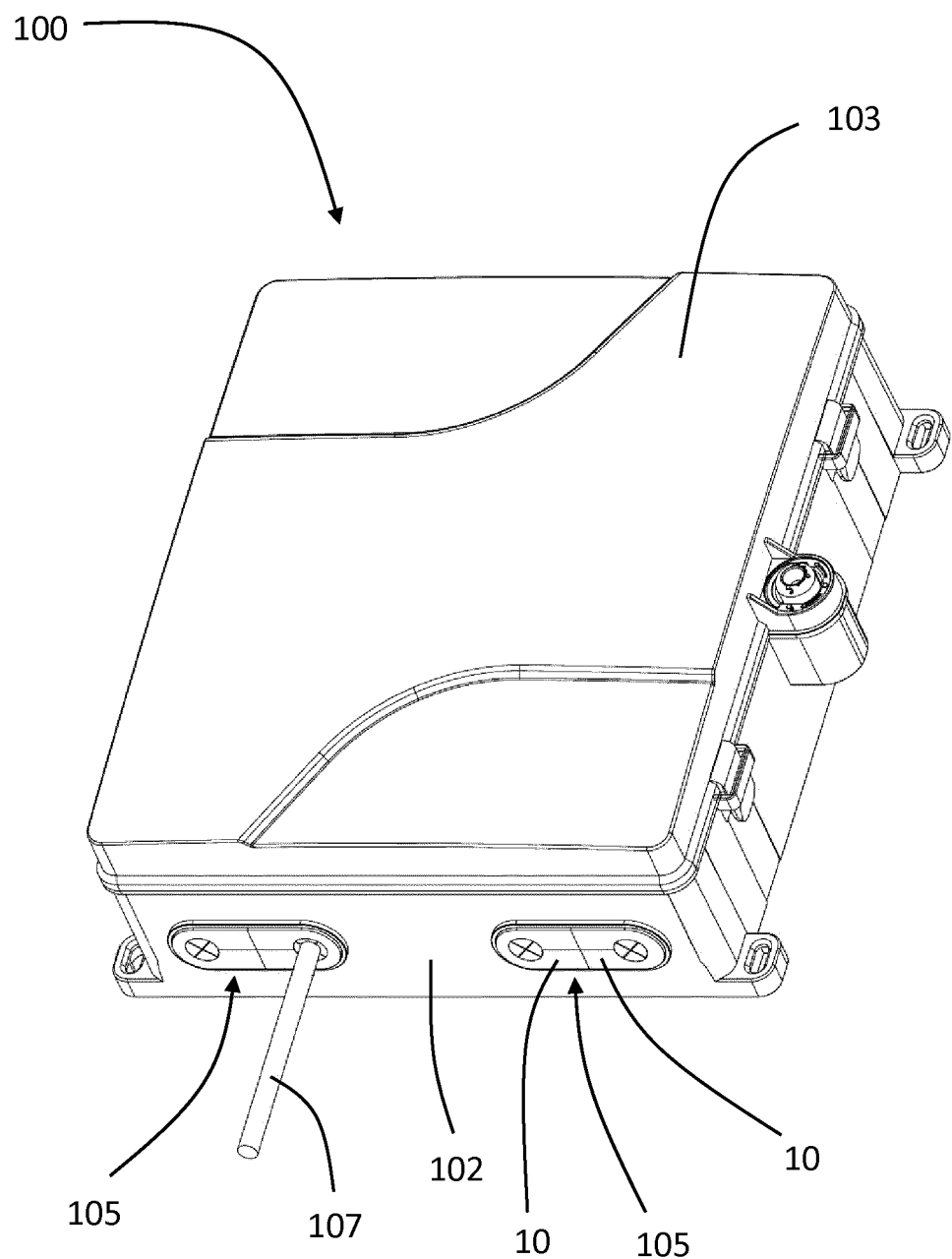
FIG. 1 is a schematic perspective view of a termination box including port sealing devices according to one embodiment of the present invention.
Figure 2:
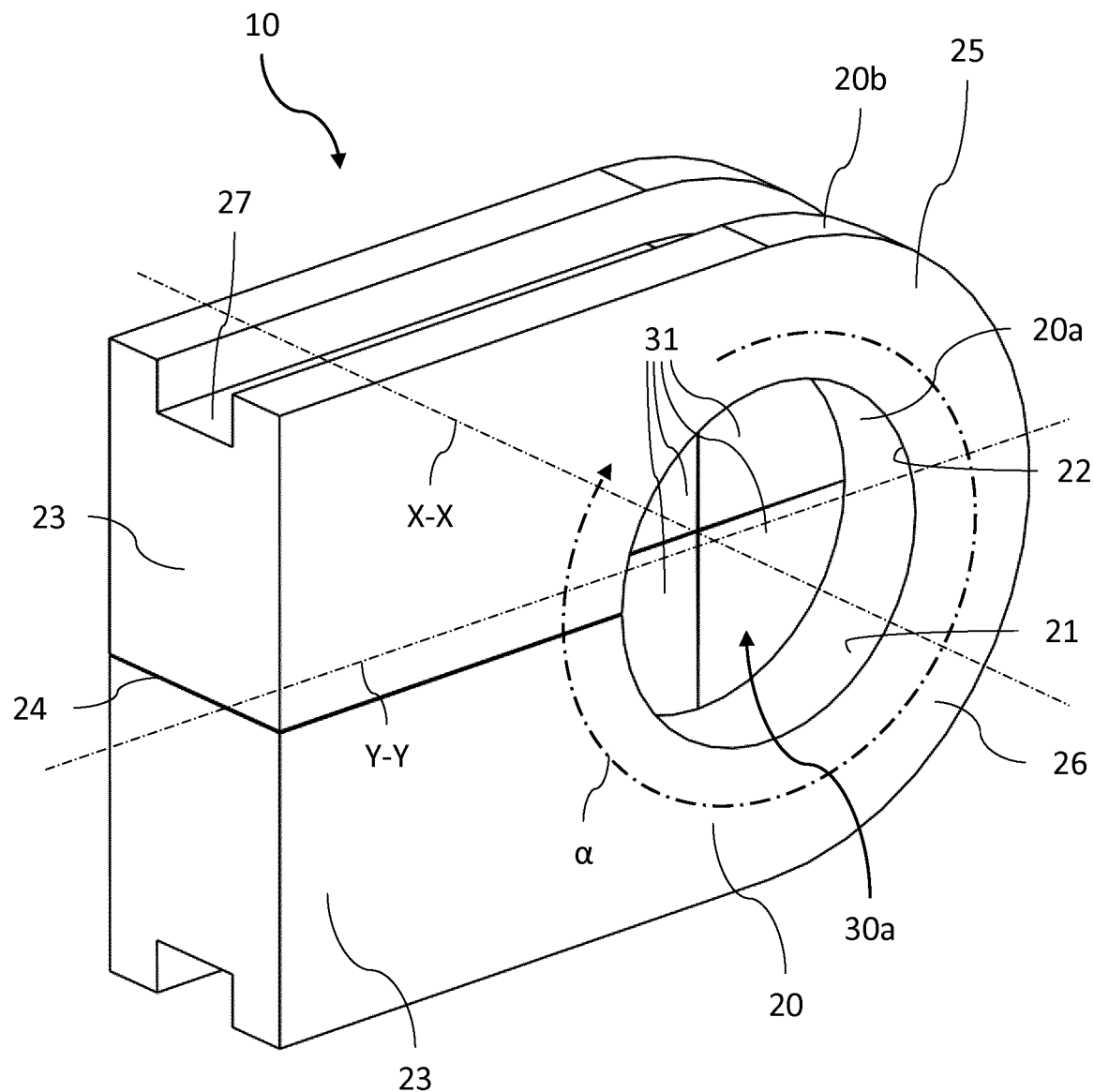
FIG. 2 is a perspective view of the port sealing device of FIG. 1 in a first configuration.
Figure 3:
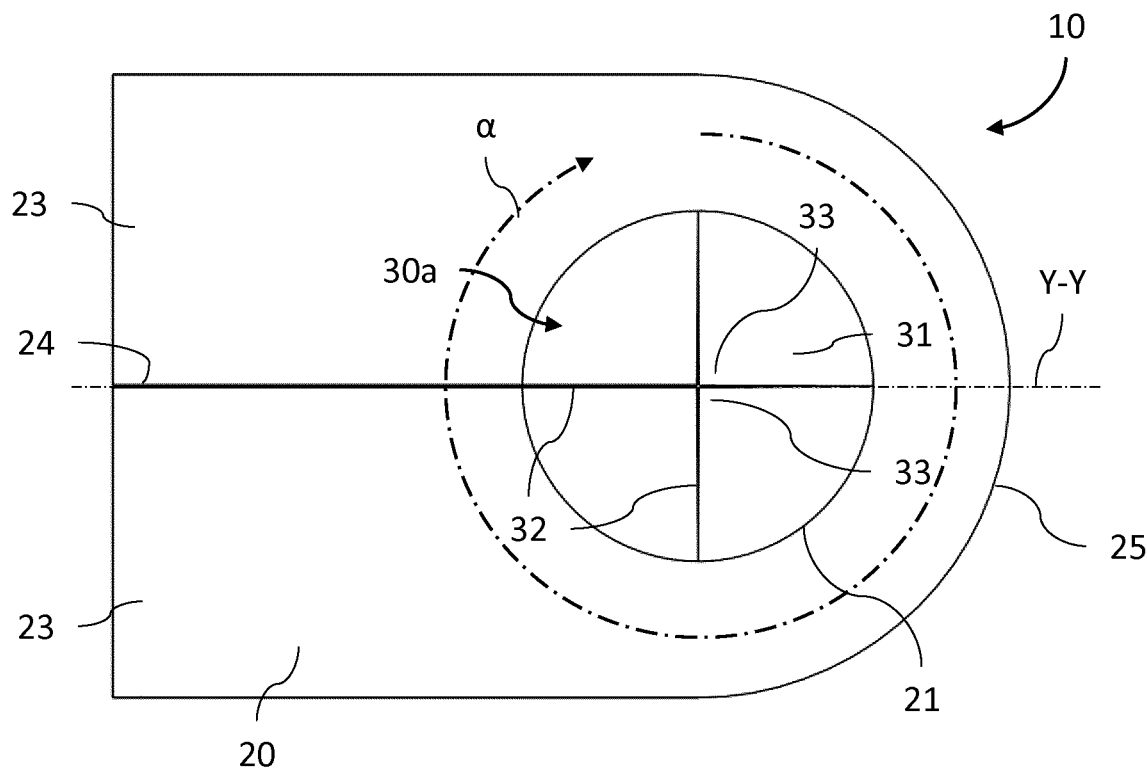
FIG. 3 is a view of the port sealing device of FIG. 1.
Figure 4:
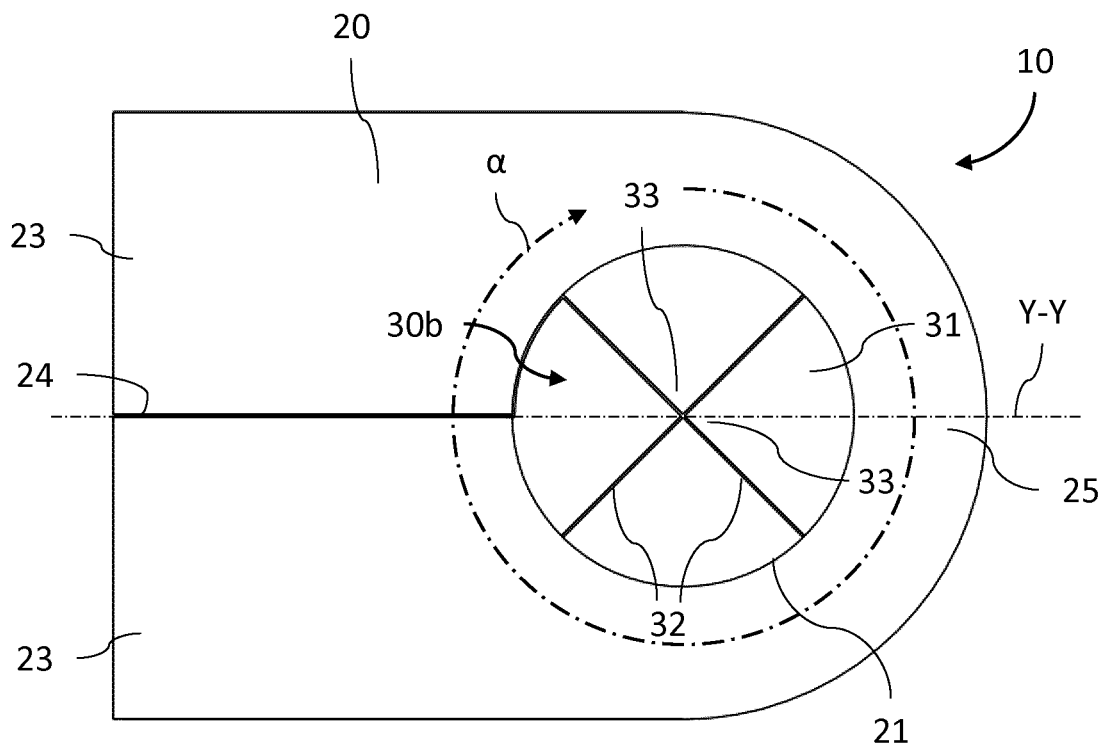
FIG. 4 is a section view of the port sealing device of FIG. 1.
Figure 5:
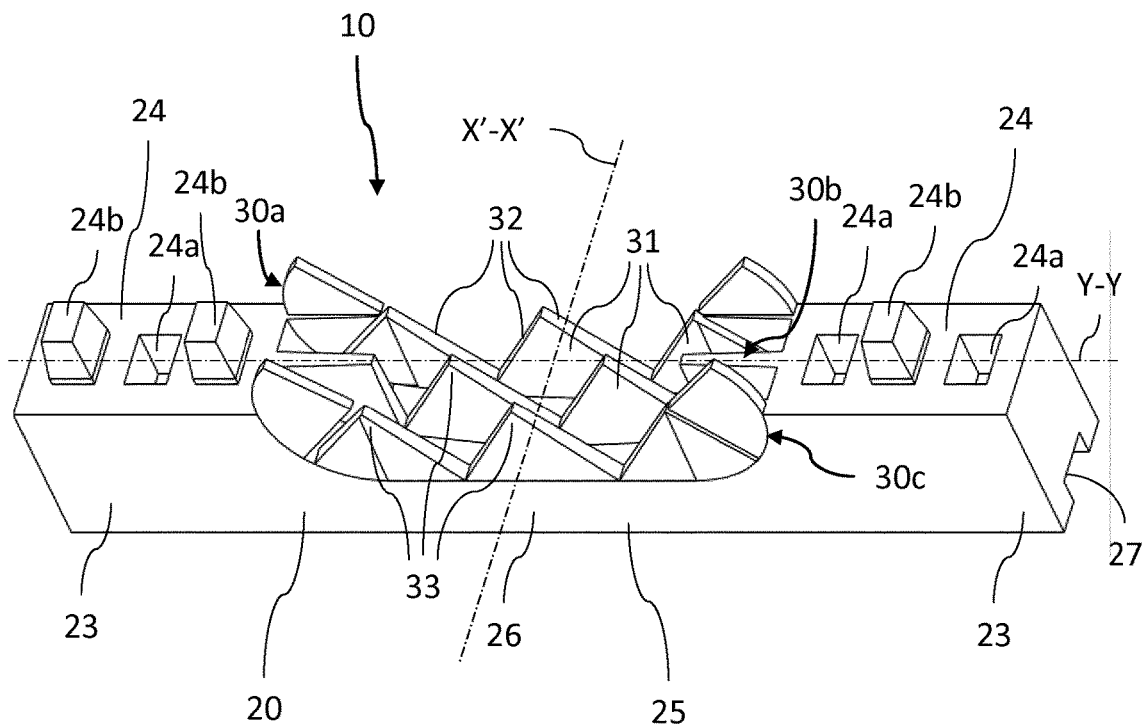
FIG. 5 is a perspective view of the port sealing device of FIG. 1 in second configuration.
Figure 6:
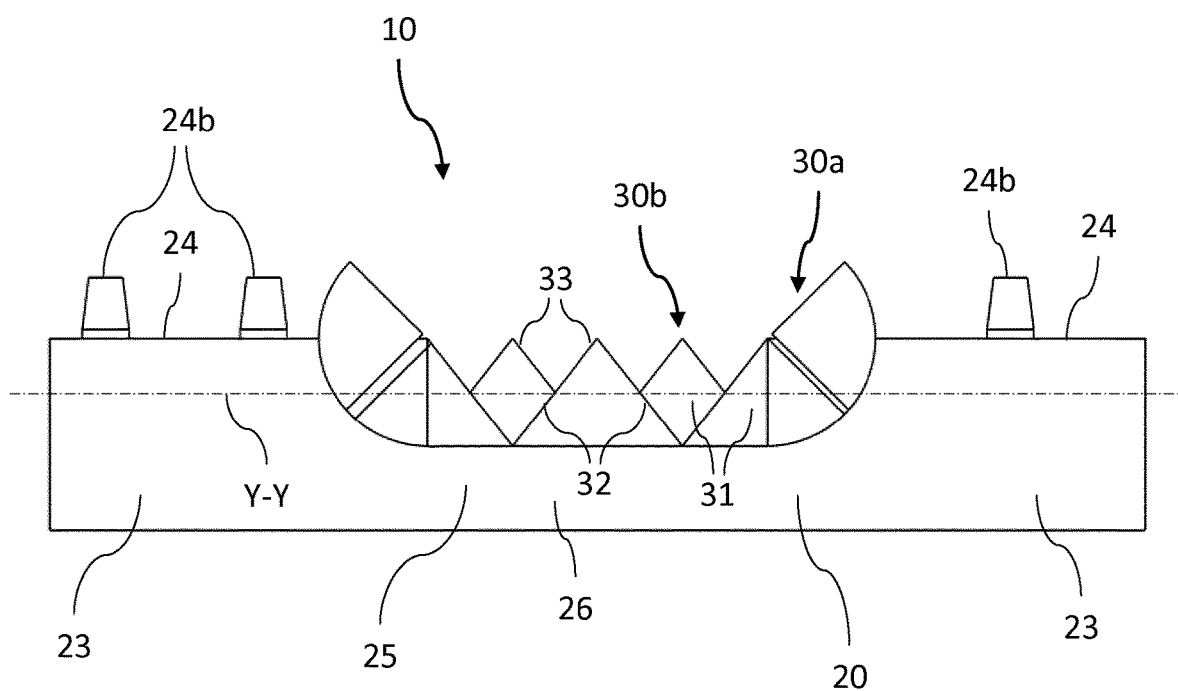
FIG. 6 is a view of the port sealing device of FIG. 5.

With reference to FIG. 1, a termination box is indicated as a whole by numeral 100.

The box 100 comprises a bottom 101, a peripheral wall 102 and a cover 103 connected to the peripheral wall 102 by hinges.

In the peripheral wall 102 a plurality of ports 105, preferably in form of openings, are provided each for giving access to the inside of the termination box 100.

Each opening 105 is able to receive a respective couple of port sealing devices depicted as a whole with numeral reference 10. Alternatively, each opening 105 may receive a respective single sealing device 10.

An optical cable 107 is shown passing through one of the ports 105 by means of the port sealing device 10.

With reference to FIGS. 2-6, a port sealing device 10 is shown. The port sealing device 10 comprises a body 20. The body 20 is configured to switch between an open configuration and a closed configuration. When the body 20 is in the closed configuration, the body 20 defines a cable pass-through channel 21 which extends along an axial direction X-X.

In the closed configuration the body 20 extends mainly in an annular direction α around the axial direction X-X. In particular, the body 20 defines two openings 22 for the passage of the optical cable 107, which are spaced apart in the axial direction X-X. The channel 21 extends between the openings 22, and preferably has a circular cross-section.

Preferably, the port sealing device 10 comprises a plurality of sealing arrays 30a, 30b, 30c connected to the body 20. In the illustrated embodiment the port sealing device 10 comprises three sealing arrays 30a, 30b, 30c.

Each sealing array 30a, 30b, 30c is arranged in the channel 21 along the annular direction α. In particular, the body 20 comprises at least three sealing arrays 30a, 30b, 30c for passage of the optical cable 106, wherein two sealing arrays 30a, 30c are preferably arranged at the openings 22 of the channel 21, and the remaining sealing array 30b is arranged between the openings 22. Each sealing array 30a, 30b, 30c is spaced apart from an adjacent sealing array 30a, 30b, 30c along the axial direction X-X.

The sealing arrays 30a, 30b, 30c are arranged in the channel 21, and the channel 21 extends along the axial direction X-X between at least two sealing arrays 30a, 30b, 30c. At least one sealing array 30a, 30b, 30c is configured to seal the channel 21 when there is no cable 107 in the channel 21, and preferably all the sealing arrays 30a, 30b, 30c are configured to seal the channel 21.

Each sealing array 30a, 30b, 30c comprises a plurality of sealing elements 31 mutually adjacent and spaced apart along the annular direction α. In particular the sealing elements 31 of a sealing array 30a, 30b, 30c are aligned along the annular direction α, and cooperate to seal the channel 30a, 30b, 30c.

In the preferred embodiment each sealing element 31 comprises a tab projecting from the body 20. In one example each sealing element 31 comprises a tab having two side edges 32 and an end portion 33. The tabs are flat and extend on planes perpendicular to the axial direction X-X.

The tabs project into the channel 21, and the end portions 33 of the tabs of a sealing array 30a, 30b, 30c mutually converge in order to seal the channel 21, for example converging towards a central axis of the channel 21. Moreover, the side edges 32 of a tab of a sealing array 30a, 30b, 30c are contiguous with the side edges 32 of an adjacent tab of the same sealing array 30a, 30b, 30c in order to seal the channel 21. Preferably, in absence of optical cables 107 the tabs are adapted to seal the channel 21.

Preferably, the sealing elements 31 are made of a flexible material, for example an elastomeric material. Accordingly, the end portions 33 of the tabs of a sealing array 30a, 30b, 30c are configured to flex along the axial direction X-X upon introduction of an optical cable 107 in the channel 21.

According to one aspect of the invention, the sealing elements 31 of a sealing array 30a, 30b, 30c are arranged in the channel 21 with a pattern different from the pattern of the sealing elements 31 of an adjacent sealing array 30a, 30b, 30c.

It is worthwhile to note that, upon insertion of an optical cable 105 in the channel 21, openings form between the sealing elements 31 of each sealing array 30a, 30b, 30c. In particular the end portions 33 of the tabs flex, and therefore the side edges 32 of some tabs space apart from the side edges 32 of the adjacent tabs.

The provision of sealing elements 31 arranged in the channel 21 with at least two different patterns in two respective sealing arrays 30a, 30b, 30c allows the sealing elements 31 of one sealing array 30a, 30b, 30c to intercept the fluid flowing through the openings of another sealing array 30a, 30b, 30c. In other words, the sealing elements 31 of the sealing arrays 30a, 30b, 30c are arranged such that the openings forming between the sealing elements 31 of one sealing array 30a, 30b, 30c are closed, along the axial direction X-X, by the sealing elements 31 of one or more adjacent sealing arrays 30a, 30b, 30c.

It is stressed that two patterns created by sealing elements 31 can be considered different one another either if the sealing elements 31 of two sealing arrays 30a, 30b, 30c define two different shapes or if the sealing elements 31 of the two sealing arrays 30a, 30b, 30c define substantially the same shape but they are rotated in the annular direction α one another. In both cases, the sealing elements 31 of one sealing array 30a, 30b, 30c are not aligned in the axial direction X-X with respect to the sealing elements 31 of the other sealing array 30a, 30b, 30c. Moreover, the openings formed between the sealing elements 31 of a sealing array 30a, 30b, 30c are not aligned in the axial direction X-X with respect to the openings formed between the sealing elements 31 of another sealing array 30a, 30b, 30c.

In a preferred embodiment, the sealing elements 31 of a sealing array 30a, 30b, 30c are annularly offset with respect to the sealing elements 31 of an adjacent sealing array 30a, 30b, 30c.

In the embodiment shown in the figures, the port sealing device 10 comprises two lateral sealing arrays 30a, 30c and one central sealing array 30b arranged between the lateral sealing arrays 30a, 30c. The two lateral sealing arrays 30a, 30c, which are not adjacent one another, have their sealing elements 31 arranged according to a common pattern. However, the central sealing array 30b has its sealing elements 31 arranged according to a pattern different from the pattern of the adjacent lateral sealing arrays 30a, 30c.

In particular, in this embodiment, each sealing element 31 extends over an angle of 90° along the annular direction α, and each sealing array 30a, 30b, 30c comprises at least four sealing elements 31. The sealing elements 31 of the central sealing array 30b are rotated by 45° along the annular direction α with respect to the sealing elements 31 of the lateral sealing arrays 30a, 30c.

In the open configuration the sealing elements 31 of each sealing array 30a, 30b, 30c are mutually adjacent along a longitudinal direction Y-Y. Moreover, in the open configuration each sealing array 30a, 30b, 30c is spaced apart from an adjacent sealing array 30a, 30b, 30c along a transverse direction X'-X' perpendicular to the longitudinal direction Y-Y.

The transverse direction X'-X' can be considered as corresponding to the axial direction X-X, since elements of the port sealing device 10, which are spaced along the axial direction X-X when the body 20 is in the closed configuration, are generally spaced along the transverse direction X'-X' when the body 20 is in the open configuration.

In order to switch the body 20 between the open and the closed configuration, the body 20 has two end portions 23, with respective connecting portions 24, and a joining portion 25 joining the two end portions 23. In the closed configuration the two end portions 23 are connected through a removable coupling of the two connecting portions 24. In the open configuration the two end portions 23 are spaced apart along the longitudinal direction Y-Y.

Therefore the port sealing device 10 can be switched between the open configuration and the closed configuration by coupling and separating the end portions 23 of the body 20. In particular the body 20 defines the channel 21 and is switched from the open to the closed configuration by bending the body 20 from the longitudinal direction Y-Y to the annular direction α, and by coupling the two end portions 23.

Preferably, one of said two connecting portions 24 comprises at least one seat 24a, and the other connecting portion 24 comprises a respective coupling member 24b which is configured to engage into the seat 24a of the connecting portion 24 for coupling the two connecting portions 24. In the illustrated embodiment one connecting portion 24 comprises one seat 24a and two coupling members 24b, while the other connecting portion 24 comprises two seats 24a and one coupling member 24b.

In the closed configuration the joining portion 25 surrounds the channel 21 and extends along the annular direction α. The joining portion 25 has two side portions 26, which are spaced in the axial direction X-X and which define the openings 22 of the channel 21. The channel 21 therefore extends in the axial direction X-X between the two side portions 26. In the open configuration the two side portions 26 are spaced in the transverse direction X'-X'.

In the open configuration the joining portion 25 extends in the longitudinal direction Y-Y. Moreover, the sealing elements 31 of each sealing array 30a, 30b, 30c are spaced apart in the longitudinal direction Y-Y along the body 20. In the preferred embodiment, in the open configuration the sealing elements 31 of a sealing array 30a, 30b, 30c are offset along the longitudinal direction Y-Y with respect to the sealing elements 31 of an adjacent sealing array 30a, 30b, 30c. Therefore, when closing the port sealing device 10, the different pattern of the sealing arrays 30a, 30b, 30c can be obtained.

In the preferred embodiment, the body 20 is made of a flexible material, for example an elastomeric material. Preferably the body 20, and in particular the joining portion 25, is configured to flex between the open and the closed configuration.

Preferably the port sealing device 10 is manufactured by moulding. In particular, the port sealing device 10 is moulded in the open configuration and, after moulding, it is switched into the closed configuration.

Preferably the port sealing device 10, and in particular the body 20, is configured to elastically deform between the open configuration, where it is in a relaxed state, and the closed configuration, where it is in an elastically charged state.

The body 20 is configured to be seated within a port 105 of the termination box 100. When the port sealing device 10 is seated within a port 105, the port 105 holds the port sealing device 10 in the closed configuration.

In particular, the body 20 comprises guiding portions 27 configured to cooperate with corresponding guiding portions (not shown) formed in a seat 106 of termination box 100.

The body 20 has an inner surface 20a, facing the channel 21 in the closed configuration, and an outer surface 20b facing away from the channel 21 and the sealing arrays protrude from the inner surface 20a in the channel 21.

In one embodiment, the guiding portions 27 of the body 20 comprise a groove formed in the outer surface 20b of the body 20. Preferably, the guiding portions of the termination box 100 comprise a rib which is arranged within a port 105 and which is adapted to be inserted in the groove of the body 20. Coupling of the guiding portions of the termination box 100 with the guiding portions 27 of the body 20 allows the port sealing device 10 to be retained within seats 105 of the termination box 100.

The invention claimed is:

1. A port sealing device comprising:
   a body configured to switch between an open configuration and a closed configuration, the body defining a cable pass-through channel extending along an axial direction when the body is in the closed configuration, the body having two end portions, each of the two end portions having a respective one of two connecting portions and a joining portion joining the two end portions, the two end portions being spaced apart along a longitudinal direction in the open configuration, and the two end portions being connected through removable coupling of the two connecting portions in the closed configuration; and
   sealing arrays arranged in the cable pass-through channel, wherein in the closed configuration,
      each of the sealing arrays being arranged in the cable pass-through channel along an annular direction around the axial direction,
      each of the sealing arrays being spaced apart from an adjacent one of the sealing arrays along the axial direction,
      each of the sealing arrays comprising sealing elements mutually spaced apart along the annular direction,
      the sealing elements of one of the sealing arrays are arranged in the cable pass-through channel with a pattern different from the pattern of the sealing elements of an adjacent one of the sealing arrays, and
   wherein in the open configuration,
      the sealing elements of each of the sealing arrays are arranged mutually adjacent along the longitudinal direction, and
      each of the sealing arrays is spaced apart from an adjacent ones of the sealing arrays along a transverse direction perpendicular to the longitudinal direction, and
   wherein the port sealing device is configured to receive an optical cable when passing through a peripheral wall of a termination box.

2. The port sealing device of claim 1, wherein the sealing elements of one of the sealing arrays is annularly offset with respect to the sealing elements of an adjacent one of the sealing arrays.

3. The port sealing device of claim 1,
   wherein the port sealing device is configured to, upon introduction of an optical cable in the cable pass-through channel, form openings between the sealing elements of each of the sealing arrays, and wherein the sealing elements of the sealing arrays are arranged such that the openings forming between the sealing elements of one of the sealing arrays is closed, along the axial direction, by the sealing elements of one or more adjacent ones of the sealing arrays.

4. The port sealing device of claim 1, wherein:
   each of the sealing elements comprises a tab projecting from the body into the cable pass-through channel,
   the tabs of the sealing arrays have mutually converging end portions.

5. The port sealing device of claim 4, wherein the end portions of the tabs of each of the sealing arrays are configured to flex along the axial direction upon introduction of an optical cable in the cable pass-through channel along the axial direction.

6. The port sealing device of claim 1, wherein the body is made of flexible material.

7. The port sealing device of claim 1, wherein one of the two connecting portions comprises a seat, and the remaining one of the two connecting portions comprises a coupling member which is configured to engage into the seat for coupling the two end portions.

8. The port sealing device of claim 1, wherein, in the open configuration, the sealing elements of one of the sealing arrays are offset along the longitudinal direction with respect to the sealing elements of an adjacent ones of the sealing arrays.

9. The port sealing device of claim 1, wherein
   the body comprises the sealing arrays, the sealing arrays comprising at least three sealing arrays for passage of the optical cable, and
   wherein the axial direction is perpendicular to the three sealing arrays.

10. The port sealing device of claim 1, wherein
    the body comprises guiding portions configured to cooperate with corresponding guiding portions formed in the termination box.

11. A port sealing device comprising:
    a body configured to switch between an open configuration and a closed configuration, wherein, in the closed configuration, the body comprises a cable pass-through channel extending along an axial direction, the body having two end portions, each of the two end portions having a respective one of two connecting portions and a joining portion joining the two end portions, the two end portions being spaced apart along a longitudinal direction in the open configuration, and the two end portions being connected through removable coupling of the two connecting portions in the closed configuration; and
    a first sealing array and a second sealing array disposed in the cable pass-through channel in the closed configuration, the first and the second sealing arrays being arranged in the cable pass-through channel along an annular direction around the axial direction, the first sealing array being spaced apart from the second sealing array along the axial direction by a spacing distance, each of the first and the second sealing arrays comprising sealing elements arranged along the annular direction, wherein the sealing elements of the first sealing array is arranged in the cable pass-through channel with a first pattern, wherein the sealing elements of the second sealing array is arranged in the cable pass-through channel with a second pattern different from the first pattern, wherein the port sealing device is configured to receive an optical cable through the cable pass-through channel.

12. The port sealing device of claim 11, wherein, in the closed configuration, along the annular direction, each of the sealing elements of the first sealing array is offset by a first angle with respect to each of the sealing elements of the second sealing array.

13. The port sealing device of claim 11, wherein the port sealing device is configured to, upon introduction of an optical cable in the cable pass-through channel in the closed configuration, form an opening between the sealing elements of the first sealing array, and wherein the sealing elements of the second sealing array is arranged such that the opening is closed, along the axial direction, by the sealing elements of the second sealing array.

14. The port sealing device of claim 11, wherein, in the closed configuration, each of the sealing elements of the first and the second sealing arrays comprise a tab projecting from the body into the cable pass-through channel, wherein the tabs have mutually converging end portions.

15. The port sealing device of claim 14, wherein, in the closed configuration, the end portions of the tabs of each of the first and the second sealing arrays are configured to flex along the axial direction upon introduction of an optical cable in the cable pass-through channel along the axial direction.

16. The port sealing device of claim 11, further comprising:
a third sealing array being arranged in the cable pass-through channel along an annular direction around the axial direction, wherein the second sealing array is disposed between the first sealing array and the third sealing array along the axial direction, wherein the third sealing array is spaced from the second sealing array along the axial direction by the spacing distance, the third sealing array comprising sealing elements arranged along the annular direction, wherein the sealing elements of the third sealing array is arranged in the cable pass-through channel with the first pattern.

17. A port sealing device comprising:
a body configured to switch the port sealing device between an open configuration and a closed configuration, wherein, in the closed configuration, the body comprises a cable pass-through channel extending along an axial direction, wherein the body comprises two end portions, each of the two end portions comprising a respective one of two connecting portions and a joining portion joining the two end portions, wherein in the open configuration, the two end portions are spaced apart along a longitudinal direction, wherein in the closed configuration the two end portions are connected through removable coupling of the two connecting portions; and
a first sealing array and a second sealing array disposed in the cable pass-through channel in the closed configuration, the first and the second sealing arrays being arranged in the cable pass-through channel along an annular direction around the axial direction,
wherein the first sealing array is spaced apart from the second sealing array along the axial direction by a spacing distance, wherein each of the first and the second sealing arrays comprise sealing elements arranged along the annular direction, wherein the sealing elements of the first sealing array is arranged in the cable pass-through channel with a first pattern, wherein the sealing elements of the second sealing array is arranged in the cable pass-through channel with a second pattern different from the first pattern, wherein, in the open configuration, the sealing elements of the first and the second sealing arrays are arranged mutually adjacent along the longitudinal direction perpendicular to the axial direction, wherein, in the open configuration, the sealing elements of the first sealing array is spaced apart from the sealing elements of the second sealing array along the axial direction perpendicular to the longitudinal direction, wherein the port sealing device is configured to receive an optical cable through the cable pass-through channel.

18. The port sealing device of claim 17, wherein one of the two connecting portions comprises a seat, and the remaining one of the two connecting portions comprises a coupling member which is configured to engage into the seat for coupling the two end portions, and wherein the body is made of flexible material.

* * * * *